United States Patent [19]

Ruyak

[11] 4,284,262
[45] Aug. 18, 1981

[54] MAGNETICALLY ACTUATED STOPPER VALVE

[75] Inventor: Robert F. Ruyak, Erie, Pa.

[73] Assignee: Autoclave Engineers, Inc., Erie, Pa.

[21] Appl. No.: 39,900

[22] Filed: May 17, 1979

[51] Int. Cl.³ .................................................. F16K 31/08
[52] U.S. Cl. ..................................... 251/65; 251/174; 251/130; 308/139
[58] Field of Search ................ 251/65, 172, 174, 130, 251/134, 133, 315; 308/139; 335/306

[56] References Cited

U.S. PATENT DOCUMENTS

| | | | |
|---|---|---|---|
| 2,289,574 | 7/1942 | Carlson | 251/65 |
| 2,346,904 | 4/1944 | Carlson | 251/65 |
| 2,589,188 | 3/1952 | DeCraene et al. | 251/65 |
| 2,644,477 | 7/1953 | King | 251/65 |
| 2,792,194 | 5/1957 | Huck | 251/65 |
| 3,347,262 | 10/1967 | Gibson | 251/65 |
| 3,355,140 | 11/1967 | Andersen | 251/65 |
| 3,359,999 | 12/1967 | Mueller | 251/174 |
| 3,458,172 | 7/1969 | Burrows | 251/315 |
| 3,472,270 | 10/1969 | Masheder | 251/172 |
| 3,680,831 | 8/1972 | Fujiwara | 251/130 |
| 3,731,904 | 5/1973 | Valince | 251/315 |
| 3,747,892 | 7/1973 | Gigantino et al. | 251/308 |
| 3,774,878 | 11/1973 | Martinez | 251/65 |
| 3,908,959 | 9/1975 | Fichtner | 251/65 |
| 4,106,825 | 8/1979 | Ruyak | 308/139 |

FOREIGN PATENT DOCUMENTS

| | | | |
|---|---|---|---|
| 1091084 | 4/1955 | France | 335/306 |
| 642353 | 8/1950 | United Kingdom | 335/306 |
| 697051 | 9/1953 | United Kingdom | 335/306 |

Primary Examiner—Martin P. Schwadron
Assistant Examiner—G. L. Walton
Attorney, Agent, or Firm—Webb, Burden, Robinson & Webb

[57] ABSTRACT

A packless magnetically actuated stopper valve. A driven magnet assembly is rotatably mounted inside a nonmagnetic bonnet. A drive magnetic holder surrounds the bonnet and rotates thereon. The driven magnet assembly turns a stopper positioned in the main valve body between inlet and outlet passages. Floating valve seats associated with each passage sealably engage the stopper.

16 Claims, 2 Drawing Figures

MAGNETICALLY ACTUATED STOPPER VALVE

BACKGROUND

This invention relates to a ball, a plug or a butterfly valve. These valves have a stopper that interrupts fluid flow in a system lined when rotated 90°. In conventional valve designs, a shaft is attached to the stopper and actuated by an external handle. The shaft is surrounded by a ring or rings of packing that maintain the pressure in the valve.

This invention relates to magnetically actuated packless valves for high pressure applications. Related patents pertaining to magnetically actuated valves, but not especially for high pressure environments say in excess of 2000 psi, are described in U.S. Pat. Nos. 3,347,262 and 3,747,892. Aspects of this invention relate to my own U.S. Pat. No. 4,106,825.

The known advantage of magnetically actuated valves is the elimination of the stuffing box which has always been a drawback. However, in the past, the use of these valves has been confined to relatively low pressures. The principal reason has been that sufficiently strong permanent magnets did not exist that would actuate the magnetic valve through the thick walls required to contain high pressures. Newly available permanent magnets permit the use of thicker walls in the valve housing providing the possibility of magnetically actuated valves for use at high pressures.

It is an object of this invention to provide a magnetically actuated valve for high pressures which will reliably open and close at minimal torques even at pressures in excess of 2000 psi. It is a further object to provide a magnetically actuated ball valve that is pressure tight at pressures exceeding 5000 psi. It is a further object to provide a self-centering valve structure that automatically positions the stopper at the correct position for proper sealing. It is a still further object to provide a magnetically actuated valve with a fail-safe manual override. It is yet another object to provide a ball valve with a unique sealing structure suitable for high pressure environments which permits a greater amount of seal wear before the seals need to be replaced.

SUMMARY OF THE INVENTION

Briefly according to this invention, there is provided a valve which comprises a pressurizable (i.e., safe at pressures in excess of 2000 psi) valve body having two aligned fluid passages and a central space therebetween. A rotatable stopper is positioned within the central space. The stopper has an opening therethrough which may be brought into registry with the aligned fluid passages or turned to block the passages. A nonmagnetic tubular pressurizable bonnet extends away from the central space and the tubular bonnet has an extended axis which passes though the central space and the stopper. A hole is provided between the central space and the bonnet. A cylindrical driven magnet holder coaxial with and surrounding said tubular bonnet carries circumferentially magnetized rare earth cobalt magnets. Typically, these magnets comprise an even number of north and south magnetic poles having substantially equal angular spacing. A rotatable control shaft projects through the opening into said central space and engages the stopper such that turning the shaft turns the stopper. The shaft is journaled within the bonnet and has mounted thereto a driven magnet assembly. Typically, the driven magnet assembly comprises circumferentially magnetized cylindrical rare earth cobalt magnets defining an equal number of north and south magnetic poles having substantially equal angular spacing. When the cylindrical holder is turned, the driven magnet assembly and control shaft will follow.

Floating valve seats are associated with the fluid passages in said valve body. The valve seats are hollow cylindrical shapes coaxial with the passages. The seats have axial ends shaped to sealably engage the stopper. Means are provided for biasing each floating valve seat against the stopper such that upon rotation of the stopper to the out of registry position, the seal engages the stopper surface.

It is preferred according to this invention that the stopper be a ball and the valve seats have shaped ends which are concave spherical surfaces.

THE DRAWINGS

Further features and other objects and advantages of this invention will become clear from the following detailed description made with reference to the drawings in which FIG. 1 is a section of one embodiment of this invention, FIG. 2 is a section of yet another embodiment, and FIG. 3 is a section taken along line III—III of FIG. 1.

DESCRIPTION OF THE PREFERRED EMBODIMENT

Figure 1:
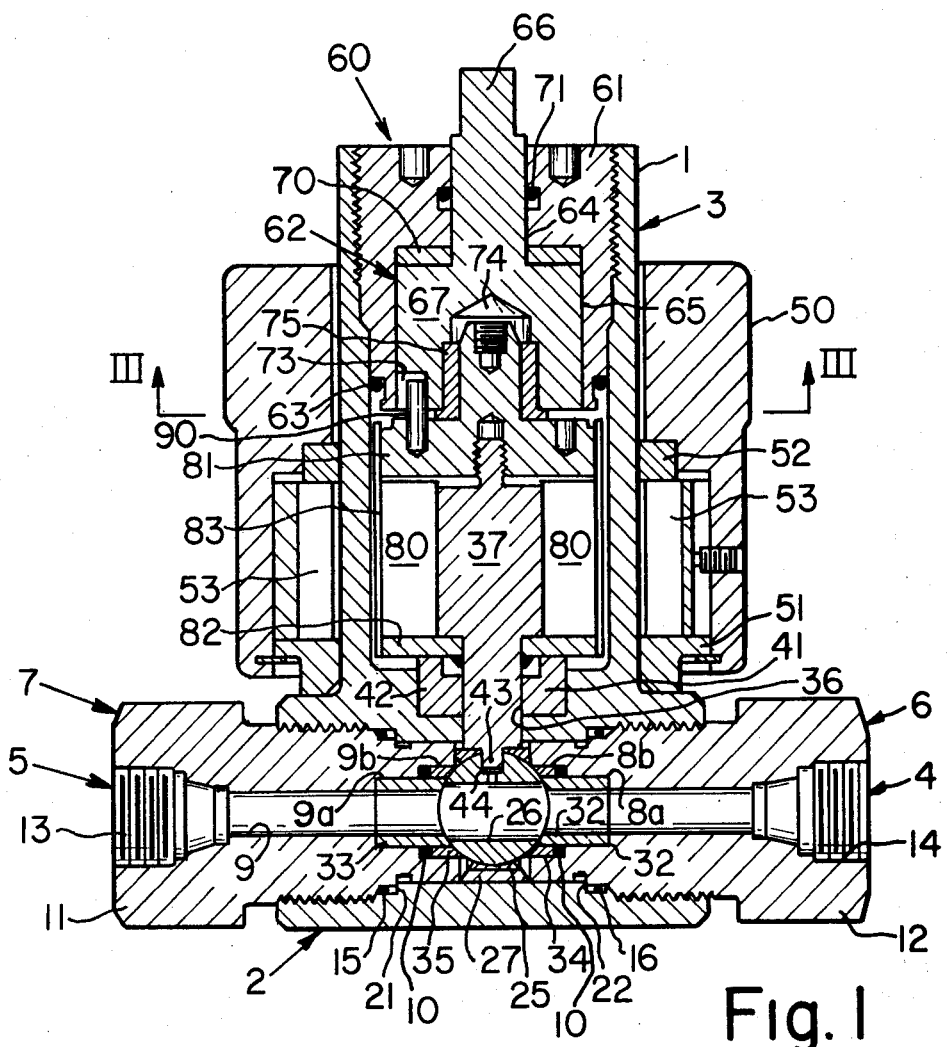

Referring now to FIG. 1, a valve body 1 comprises a steel shape, having a fluid passage portion 2 and a nonmagnetic bonnet 3. In a typical embodiment, the fluid passage portion is arranged for aligned inlet 4 and outlet 5 passages. The bonnet 3 has tubular cylindrical walls having a cylindrical axis transverse to the direction of the inlet and outlet passages. In the embodiment shown in FIG. 1, the tubular walls of the bonnet are formed integral with the remainder of the valve body but could be secured thereto by welding and/or by threads and an appropriate gasket. The bonnet 3 may have a integral cap closing off the end away from the fluid passage portion or a cap may comprise a plug or plugs threadably engaging the bonnet.

Opposite tubular valve body extensions 6, 7, which are identical elements, are threaded into the remainder of the valve body. The bores 8, 9 within the extensions define fluid passageways. The extensions have exposed bosses 11, 12 which are provided with means for connecting the valve inlet and outlet to the remainder of the high pressure system. Means for making the connections such as threads 13, 14 are understood in the art.

O-rings 15, 16 are provided on a recessed cylindrical ledge between the valve body extensions 6, 7 and the main valve body 2. These O-rings are compressed when the valve body extensions turn into the valve body and seal one to the other. The movement of the valve body extensions toward each other is restricted by stops 21, 22. Between the valve body extensions exist a central space. Within the central space is located the stopper 25 having a passage 26 passing therethrough which can be brought into registry with the inlet and outlet passages 8, 9 permitting flow therebetween. By 90° rotation, the stopper, shown in FIG. 1 as a ball, may block flow. The ball is nested in a ball spacer 27 which preferably comprises an annular liner in the central space with a segment eliminated near the bonnet. The liner is preferably made of synthetic polymer material such as that sold under the tradename Rulon.

The extensions 6, 7 in addition to having passageways, have countersunk recesses including deep recesses 8a, 9a of inner diameter greater than the inner diameter of the passages 8, 9 and less deep recesses 8b, 9b of even greater inner diameter. Cylindrical inserts 32, 33 have an outer diameter sized to enable press fit of the inserts into the deep recesses 8a, 9a and an inner diameter approximately the same as the inner diameter of the fluid passageways 8, 9. The inserts 32, 33 and the less deep recesses 8a, 9a define annular grooves facing the central space and, of course, the stopper. These grooves retain floating cylindrical seals 34, 35. End faces of the cylindrical seals 34, 35 are shaped to conform to the outer surface of the stopper which must, of course, have rotational symmetry around the axis on which it is rotated. In the valve shown in FIG. 1, the stopper is a ball or sphere. Hence, the end faces of the seals are curved surfaces of an imaginary spherical segment. O-rings 10 made of an elastomeric material are placed in the bottom of the annular grooves before the cylindrical seals are inserted. These serve to bias the seals against the stopper.

An opening 36 passes between the central space and the bonnet. A rotatable control shaft 37 is journaled in the bonnet and passes through the opening 36. A recess from the bonnet surrounding the opening 36 is arranged to receive an annular bushing 42 typically a polytetrafluorethylene. The manner in which the control shaft is journaled at the other end is described later on in this application. On the bottom of the control shaft 37 is a key 43. The ball 25 has a keyway 44 for receiving the key. Thus the shaft cannot be rotated without also rotating the ball 25. The key 43 may slidably engage the keyway 44 and the bottom edge of the key (considering the orientation in FIG. 1) may be spaced from the bottom of the keyway. Thus a certain amount of relative movement of the shaft and ball is permitted. This enables a small amount of self alignment of the ball within the central space.

A cylindrical holder 50 for drive magnets is rotatably mounted to the bonnet by bearings 51, 52 which may simply be nylon rings. The cylindrical holder 50 may suitably be fabricated from aluminum. The function of the cylindrical holder is to carry drive magnets 53 which preferably are cylindrical magnets of the rare earth cobalt type (best of all samarium cobalt). The magnets have a plurality of alternating north and south poles at least around the inner periphery thereof.

The nonmagnetic bonnet 3 as illustrated in FIG. 1 has a cap 60 closing off the end away from the central space (as oriented in FIG. 1 closing off the top). The cap 60 comprises a threaded annular outer plug 61 and a coaxial inner plug 62 that turn within the outer annular plug. The outer plug 61 is threaded into internal threads provided in the cylindrical wall of the bonnet. An O-ring seal 63 prevents leakage through these threads.

Figure 3:
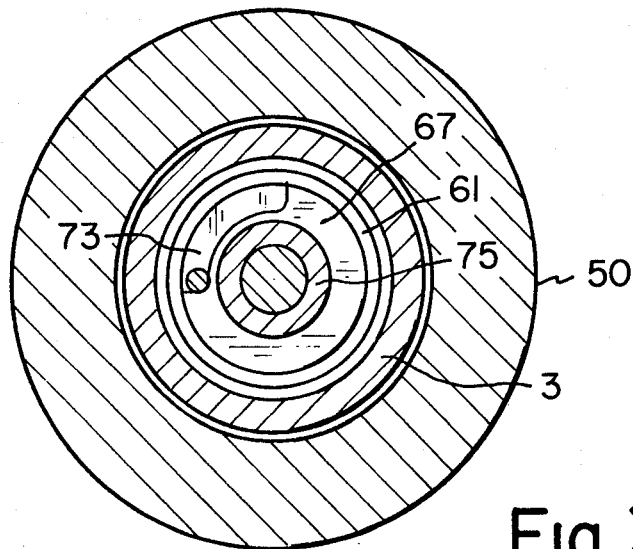

The outer plug 61 of the cap 60 has a small diameter bore 64 extending its entire length and a larger diameter recess 65 from the inner face of the cap which extends partially through the outer plug. The inner plug 62 has a shaft 66 which extends up through the small diameter bore 64 of the outer plug. Attached to the shaft 66 is a larger diameter part 67 of the inner plug that has an outer diameter slidably fitting with the larger diameter recess 65. Sandwiched between adjacent radial faces of the inner and outer plugs is an annular bearing 70 of synthetic polymer material, for example, material sold under the trade name Rulon. An O-ring 71 provides a pressure seal between the shaft 66 and the bore 64. The inner radial face of the inner plug 62 has a 90° circular groove 73 with its center of curvature at the turning axis of the inner plug. This is best seen in FIG. 3.

Also on the inner face of the inner plug 62 is a bore 74 coaxial with the turning axis of the inner plug. A cylindrical bushing 75, for example, polytetrafluorethylene, lines the bore and has a radial flange covering a portion of the inner face of the inner plug. Thus the control shaft 37 or an extension thereof is journaled at its end away from the stopper within the cap.

The control shaft 37 carries circumferentially magnetized cylindrical rare earth cobalt magnets 80 defining an equal number of north and south magnetic poles having the same equal angular spacing as the magnets in the housing 50. It is preferable that the magnets 80 are encapsulated within a stainless steel sheath. In the embodiment illustrated, a top cap 81 defines an upper axial end of the encapsulating shield for the magnets 80. It is shown to be threaded to the shaft 37 and has a shaft-like extension coaxial with the shaft 37 which is journaled in the bore 74 of the cap 60. The annular plate 82 comprises the lower axial surface of the stainless steel encapsulation. It is welded in place. A very thin can is welded to the upper 81 and lower 82 end pieces. Note that the axial end pieces of the encapsulation bear upon the thrust retaining surfaces of bearings 41 and 75.

Extending upwardly from the end piece 81 is a pin 90. The pin enters the cylindrical groove 73. Thus the driven magnet assembly can be magnetically turned through 90° without interference. At the end of the 90° rotation in either direction, the pin strikes the end of the groove and inhibits further rotation. (The groove could be greater or lesser than 90° in which event the free rotation will be greater or lesser). In the event of a lock up of the valve that cannot be magnetically actuated, the inner plug can be turned through a maximum of 180° in either direction to cause the valve stopper to turn through 90°. The inner plug may be turned by placing a wrench on the exposed end of stem 66.

Figure 2:
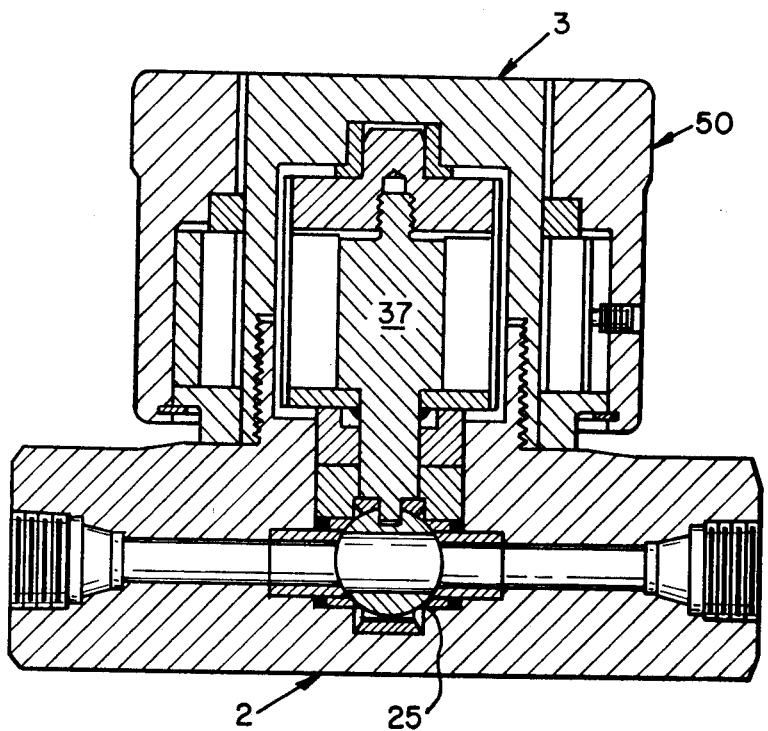

FIG. 2 describes another embodiment in which the numerous identical elements bear the same number as in FIG. 1. In this embodiment, the bonnet has a permanently closed end. Further, the bonnet has threads at its lower inside diameter for engaging the valve body.

Having thus described the invention with the detail and particularity required by the Patent Office, what is desired protected by Letters Patent is set forth in the following claims:

1. A valve comprising
    a pressurizable valve body having two fluid passages and a central space between said passages,
    a rotatable stopper positioned within said central space having an opening therethrough which may be brought into registry or out of registry with the fluid passages,
    a nonmagnetic tubular pressurizable bonnet having an extended axis passing through the central space and rotatable stopper, said bonnet having a closed end away from the central space,
    said valve body and bonnet defining a central opening connecting the interior of the bonnet and the central space,
    a cylindrical drive magnet holder coaxial with and surrounding said tubular bonnet, said holder mounted rotatably thereto, said holder carrying rare earth cobalt magnets defining an even number of north and south magnetic poles, a rotatable control shaft projecting through said central opening, said shaft engaging said stopper such that turning the shaft turns the stopper, said shaft having mounted thereto driven magnet assembly comprising rare earth cobalt magnets defining an equal number of north and south magnetic poles such that when the cylindrical holder is turned, the driven magnet assembly and control shaft will follow, the control shaft and mounted driven magnet assembly being rotationally supported in the bonnet substantially coaxial therewith by thrust bearings to resist the axial movement of the shaft, valve seats associated with each fluid passage in said valve body and being hollow cylindrical shapes coaxial with said fluid passages, said seats having axial ends shaped to sealably engage said stopper, means for securing each valve seat against the said stopper, and an independent means for direct mechanical actuation of said control shaft and driven magnet assembly such that the control shaft and driven magnet assembly freely turn through about 90° by magnetic actuation without interference by said independent means.

2. A valve according to claim 1 wherein the stopper is a ball and the valve seats have shaped ends which are concave spherical surfaces for engaging the ball.

3. A valve according to claim 1 wherein the valve body is comprised of at least one extension threaded therein defining one of said fluid passageways, said extensions supporting one of said valve seats and associated securing means.

4. A valve according to claim 1 wherein said bonnet has an integral closed axial end and an opposite axial end threadably secured to the remainder of the valve body.

5. A valve according to claim 1 wherein the closed end of said bonnet has a cap threadably secured therein and the opposite axial end is secured to the remainder of the valve body.

6. The valve according to claims 1, or 13 wherein the driven magnetic assembly is encapsulated in a nonmagnetic can.

7. The valve according to claims 1, or 13 wherein said thrust bearings and floating valve seats are of a synthetic polymer material.

8. The valve according to claim 1 wherein said bonnet has cylindrical recesses at each end for receiving annular bushings of a synthetic material for journaling the shaft and restricting axial movement of the shaft.

9. The valve according to claim 8 wherein the driven magnetic assembly is encapsulated in a nonmagnetic can and the axial ends of the can bear upon said annular bushings.

10. The valve according to claim 1 wherein the stopper has a keyway therein and the end of the control shaft entering the central space has a key thereon, the depth of the keyway being such that the key does not engage the bottom of the keyway.

11. A valve comprising a pressurizable valve body having two aligned fluid passages and a central space between said passages, a rotatable spherical stopper positioned within central space having an opening therethrough which may be brought into registry or out of registry with the aligned fluid passages, a nonmagnetic tubular pressurizable bonnet having an extended axis passing through the said central space and rotatable stopper, said bonnet having a closed end away from the central space, said valve body and bonnet defining a central opening connecting the interior of the bonnet and the central space, a cylindrical driven magnetic holder coaxial with and surrounding said tubular bonnet, said holder mounted rotatably thereto, said holder carrying circumferentially magnetized rare earth cobalt magnets defining an even number of north and south magnetic poles having substantially equal angular spacing, a rotatable control shaft projecting through said central opening, said shaft engaging said stopper such that turning the shaft turns the stopper, said shaft having mounted thereto a driven magnet assembly comprising circumferentially magnetized cylindrical rare earth magnets defining an equal number of north and south magnetic poles having substantially equal angular spacing such that when the cylindrical holder is turned, the driven magnet assembly and control shaft will follow, the control shaft journaled in a bushing near the central openings and in a bushing in the closed end of the bonnet, said shaft being substantially coaxial with said bonnet there being thrust bearings near each said bushing to resist the axial movement of the shaft, floating valve seats associated with each fluid passage in said valve body and being hollow cylindrical shapes of synthetic polymer material coaxial with said fluid passages, said seats having axial ends shaped to sealably engage said stopper, means comprising O-rings of elastomeric material for biasing each floating valve seat against the said stopper, and an independent means for direct mechanical actuation of said control shaft and driven magnet assembly such that the control shaft and driven magnet assembly freely turn through about 90° by magnetic actuation without interference by said independent means.

12. The valve according to claim 11 wherein the biasing means is an O-ring of elastomeric material.

13. A valve comprising a pressurizable valve body having two fluid passages and a central space between said passages, a rotatable stopper positioned within said central shape having an opening therethrough which may be brought into registry or out of registry with the fluid passages, a nonmagnetic tubular pressurizable bonnet having an extending axis passing through the central space and rotatable stopper, said bonnet having a closed end away from the central space, said valve body and bonnet defining a central opening connecting the interior of the bonnet and the central space, a cylindrical drive magnet holder coaxial with and surrounding said tubular bonnet, said holder mounted rotatably thereto, said holder carrying rare earth cobalt magnets defining an even number of north and south magnetic poles, a rotatable control shaft projecting through said central opening, said shaft engaging said stopper such that turning the shaft turns the stopper, said shaft having mounted thereto driven magnet assembly comprising rare earth cobalt magnets defining an equal number of north and south magnetic poles such that when the cylindrical holder is turned, the driven magnet assembly and control shaft will follow, the control shaft and mounted driven magnetic assembly being rotationally supported in the bonnet substantially coaxial therewith of the shaft, valve seats associated with each fluid passage in said valve body and being hollow cylindrical shapes coaxial with said fluid passages, said seats having axial ends shaped to sealably engage said stopper, means for securing each valve seat against the said stopper, the closed end of the bonnet comprised of inner and outer coaxial plugs, said inner plug extending through a central opening in said outer plug and being rotatable relative thereto, said outer plug being threadably secured to the bonnet, a pressure seal between said plugs, means extending between said inner rotatable plug and said driven magnetic assembly such that while the magnetic assembly can be freely turned through about 90° without interference by said extending means further rotation is restricted and such that turning the inner rotatable plug through a maximum of 180° will cause the shaft to turn through 90° permitting manual opening or closing of the valve.

14. A valve according to claim 13 wherein the inner plug has a bore therein coaxial with the control shaft in which the control shaft is journaled.

15. The valve according to claim 13 wherein the inner rotatable plug has an arcuate groove therein defining an approximately 90° circular arc with its center of curvature at the turning axis of the plug, the driven magnet assembly being encapsulated in a nonmagnetic can and the extending means comprising a peg fixed to the can and extending into the arcuate groove.

16. The valve according to claim 13 wherein the magnets on the shaft are encapsulated in a magnetic can and the can has a radial end face and wherein the radial end face nearest the closed end of the bonnet has an arcuate groove therein defining an approximate 90° circular arc with its center of curvature at the axis of the shaft, and the extending means comprises a pin pendent from the rotatable plug extending into said arcuate groove.

* * * * *